United States Patent
Lacey et al.

(10) Patent No.: US 10,080,136 B2
(45) Date of Patent: Sep. 18, 2018

(54) CREDIBILITY TOKEN SYSTEM FOR OVER THE AIR MULTI-PROGRAMMING OF A WIRELESS DEVICE AND METHOD OF OPERATION

(71) Applicants: Bruce Blaine Lacey, Foster City, CA (US); R. Travis Jones, Lake Zurich, IL (US)

(72) Inventors: Bruce Blaine Lacey, Foster City, CA (US); R. Travis Jones, Lake Zurich, IL (US)

(73) Assignee: AT&T MOBILITY IP, LLC, Atlanta, GA (US)

( * ) Notice: Subject to any disclaimer, the term of this patent is extended or adjusted under 35 U.S.C. 154(b) by 150 days.

(21) Appl. No.: 14/860,308

(22) Filed: Sep. 21, 2015

(65) Prior Publication Data

US 2016/0007198 A1 Jan. 7, 2016

Related U.S. Application Data

(63) Continuation-in-part of application No. 13/726,580, filed on Dec. 25, 2012, now Pat. No. 9,973,492.

(51) Int. Cl.
*H04W 12/06* (2009.01)
*H04L 9/08* (2006.01)
(Continued)

(52) U.S. Cl.
CPC .......... *H04W 12/06* (2013.01); *H04L 9/0872* (2013.01); *H04L 9/3268* (2013.01);
(Continued)

(58) Field of Classification Search
CPC ......... G06F 2221/2111; H04L 63/0823; H04L 9/0872; H04L 9/3263; H04L 61/6022;
(Continued)

(56) References Cited

U.S. PATENT DOCUMENTS

2009/0265775 A1* 10/2009 Wisely ................ H04L 63/0492
726/9
2013/0189953 A1* 7/2013 Mathews .............. H04W 12/06
455/411

(Continued)

OTHER PUBLICATIONS

Carrier IQ, Understanding Carrier IQ Technology (Dec. 12, 2011).*
(Continued)

*Primary Examiner* — Theodore C Parsons
(74) *Attorney, Agent, or Firm* — Workman Nydegger

(57) ABSTRACT

A mobile secure agent on a wireless device executes co-resident authenticated data collection profiles provisioned by private profile producers. Each wireless device has a MAC address that is transformed into a credibility token which is included in a notification to execute or update a data collection profile. The credibility token may also include attributes of location current or stored data. Each wireless device retains location history data transformed by encryption or by hashing. Each data package can only be transmitted to a collector certificated by the same private profile producer. Update profiles are signed and provisioned through a tunnel initiated from the mobile secure agent. A Certificate Authority provides libraries, anchors, and certificates in a key management message module to each mobile secure agent which enables revocation and replacement of certificates. Data stored in this way may only be transmitted to one destination per profile.

20 Claims, 6 Drawing Sheets

(51) Int. Cl.

| | |
|---|---|
| *H04L 29/06* | (2006.01) |
| *H04L 9/32* | (2006.01) |
| *H04W 8/22* | (2009.01) |
| *H04W 8/24* | (2009.01) |
| *H04W 4/12* | (2009.01) |
| *H04W 4/14* | (2009.01) |
| *H04W 4/02* | (2018.01) |
| *H04L 29/12* | (2006.01) |
| *H04W 4/50* | (2018.01) |
| *H04W 12/02* | (2009.01) |

(52) U.S. Cl.
CPC ...... *H04L 61/6022* (2013.01); *H04L 63/0823* (2013.01); *H04L 63/126* (2013.01); *H04W 4/02* (2013.01); *H04W 4/12* (2013.01); *H04W 4/14* (2013.01); *H04W 4/50* (2018.02); *H04W 8/22* (2013.01); *H04W 8/24* (2013.01); *G06F 2221/2111* (2013.01); *H04W 12/02* (2013.01)

(58) Field of Classification Search
CPC .... H04L 63/126; H04L 9/3268; H04W 4/001; H04W 4/02; H04W 4/12; H04W 4/14; H04W 8/22; H04W 8/24; H04W 12/06; H04W 12/02
See application file for complete search history.

(56) References Cited

U.S. PATENT DOCUMENTS

| | | | |
|---|---|---|---|
| 2013/0191903 A1* | 7/2013 | Jaudon | H04L 63/08 726/7 |
| 2014/0181505 A1* | 6/2014 | Moore | H04L 63/0823 713/156 |
| 2015/0089613 A1* | 3/2015 | Tippett | H04L 63/0853 726/7 |
| 2015/0181548 A1* | 6/2015 | Varoglu | H04W 64/00 455/456.2 |
| 2015/0262444 A1* | 9/2015 | Gilligan | G06Q 30/0205 705/12 |
| 2016/0044719 A1* | 2/2016 | Sidhu | H04W 76/021 370/329 |
| 2016/0164855 A1* | 6/2016 | Johansson | H04L 63/08 726/3 |

OTHER PUBLICATIONS

John Cox, What's really going on with Carrier IQ on your phone, Network World (Dec. 7, 2011).*

Elvin Cheng, An Introduction to Mutual SSL Authentication, CodeProject, https://www.codeproject.com/Articles/326574/An-Introduction-to-Mutual-SSL-Authentication, retrieved Jul. 10, 2017 (Feb. 8, 2012).*

* cited by examiner

CREDIBILITY TOKEN SYSTEM FOR OVER THE AIR MULTI-PROGRAMMING OF A WIRELESS DEVICE AND METHOD OF OPERATION

CROSS-REFERENCES TO RELATED APPLICATIONS

This continuation in part application benefits from Ser. No. 13/726,580 filed Dec. 25, 2012 which is incorporated by reference in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The present invention relates to privacy and security in data collection of telecommunications failure and performance metrics and more specifically wherein the programming control is generated at a plurality of places other than the locations of a device which is being programmed, operated, or measured. Furthermore, the user of various wireless applications is protected from intrusion and data leakage.

Description of the Related Art

Today our smartphones, no longer merely wireless handsets, have become a unified interface to our friends, family, government, employer, client, and business and social partners. Each relationship is different and often changes. There is no longer a single service that is provided by a mobile wireless device. Accordingly power has shifted toward the edge of our human networks.

In one conventional business model, a cellular telephone customer obtained both services and goods from a single integrated vendor and agreed to the terms and conditions on offer as a Hobson's choice. Data collected on the mobile device was primarily utilized to ensure customer satisfaction of the telephony service. In the present time, business relationships are more fragmented. Many services are provided to a single mobile user and handsets may be independently sold, leased, owned, and replaced. Instead of a hierarchical carrier-customer base data relationship, it tends increasingly toward a mesh with multi-dimensional tension.

As we place more of our information on personal devices and use it to sustain multiple financial and personal relationships, there is an increased need for privacy for our data and control over where we choose to share it. There is an economic advantage to offer access to our individual data and the benefits of exchanging access should be more equally shared among data sources and data consumers.

Conventional mobile wireless devices may be configured to collect quality of service statistics or under conditions collect and transmit data defined in a data collection profile and executed by an agent. User expectations of a sense of connectedness, and cradle to grave support services are potentially in conflict with a desire for privacy.

As is known, Short Message Service (SMS) is specified by the ETSI (standards GSM 03.401 and 03.382). A security server may transmit a text message via a Short Message Service Center to a recipient using the signaling paths needed to control the telephone traffic. SMS can be implemented in every mobile station by standard software.

Other text messaging services may be employed for the same result. SMS is an exemplary and well-known text messaging service. Multi-media messaging services are extensions of the same technology and are equivalent for the purpose of notification. As is known steganography provides a mechanism for embedding text within an image which may provide the notification and credibility token. As is known, Wi-Fi refers to any one of the radio protocols documented in the 802.11 standards for data communications. As is known, MAC refers to a media access control system which specifies an address for each device.

Conceptually, we need orthogonal data channels from each device user to many relationship partners. This would provide a way to enable data channels from each device to support more than a single relationship and in a way that does not depend on others to ensure the data only goes where intended.

If, when personalized data becomes available, it could be collected only on certain conditions controllable by the person, and, even if data is intended to be shared with more than one recipient, it would be transmitted in a way that avoids leakage among the recipients.

As more people and systems depend on wireless connectivity, it must receive greater protection from hijacking for theft of their data or mere malicious denial of service attacks.

Thus it can be appreciated that what is needed is a way to securely collect and transmit private data exclusively to authorized recipients and to protect users from data leaks to unauthorized recipients and verify the provenance of data collection profiles prior to installation and execution at any mobile device.

BRIEF SUMMARY OF THE INVENTION

Our objective is to enable Independent data collection and sharing on the same platform. A cellular telephone user may choose to share data collected on her phone with more than one recipient and more conveniently differentiate which data is shared with whom. Data collection is performed independently for each recipient. The same mobile wireless platform is equipped with silos for independent collection, packaging, and transfer to disparate destinations.

Instead of a master-slave or client-server business model, the user and her phone may be treated as a data hub connected to many unique spokes. Each spoke receives different packages and they are collected asynchronously. The metric measurements are specified, with collection triggers, in a unique data collection profile for each relationship.

The additional capability over conventional data collection takes advantage of multi-core processors utilized in servers and in mobile devices to provide isolation and parallelism. Several data collectors may be operating in a compact physical installation without loss of desirable isolation. Similarly, an agent on a mobile device may perform tasks specified by more than one profile and safely transmit data to each data collector having a different certificate.

Ideally, a mobile device customer or user enjoys personal control over which relationships to engage or disengage from. The degree of data sharing can be commensurate with the value the data provider receives from the service or vendor.

Each data delivery recipient is enabled by a separate orthogonal profile which may be installed or de-installed independent of other relationships and services.

Because each profile is self-contained, a user can evaluate the benefits of sharing metrics with each relationship and when dissatisfied, decline to provide some or all of it.

Because relationships may change dynamically, some data collection profiles may be added, removed, or modified more urgently than others.

Advantageously, it becomes unnecessary to replace every data collection trigger and transformation to accommodate minor changes for one of many partners. While more than one profile may contain the same trigger, the packaging and upload of metrics can reflect the different responsivity among the recipients.

As new relationships are agreed, a separate profile may be created, authenticated, and uploaded without interfering with on-going relationships. There does not have to be an integrated release and update schedule.

However, the system provides economies of scale in protecting the devices and the data by using the same security processes and infrastructure. Each data relationship does not have to build out its own security system.

The devices themselves may filter notifications which suggest events such as uploads or updates to profiles and security attributes. The notifications are customized in one or more ways to each device so that an attempt to mass notification message multiple devices will be ignored. Embodiments make the strategy of guessing device identities a lower percentage success rate.

Nor can data collected for one recipient be mislaid or misdirected to another recipient. Each package is transferred through a secure tunnel initiated from the mobile device to a particular collector with a unique certificate. Each profile has certificates for data protection and authentication.

A system comprises a plurality of mobile secure agents each of which has received from a certificate authority a plurality of anchors, certificates, libraries, and related authentication modules. Upon determining conditions specified in at least one data collection profile, a mobile secure agent will transmit an encrypted data package to at least one certified data package collector. No transmission can occur to a collector without a certificate signed by a specific signing authority. Each of the private profile producers provides a certificate to a data package collector which has been authenticated by the unified mobile security certificate authority (CA). Each private profile producer validates an initial or updated data collection profile stored at a certified profile update provisioner. The update provisioner is enabled to establish a certificated SSL tunnel upon request from a mobile secure agent.

Each mobile secure agent requests a SSL tunnel on its own schedule, on conditions encoded in a profile, or in response to a text messaging system notification. Upon request from a private profile producer, a secure notifier will transmit a text message system notification to at least one mobile secure agent that a new profile may be retrieved or that the data package collectors are ready for an upload, or that other key management messages are pending delivery.

Each private profile producer enables a data package collector to receive only data packages collected according to an authenticated profile signed by the private profile producer. The profiles are retrieved by the mobile secure agents through an SSL tunnel. A Certificate Authority can revoke or initialize new certificates for each private profile producer.

A credibility token is included with a notification to execute or update a profile to combat SMS spoofing. A method transforms a media access control (MAC) address into a credibility token. Furthermore location data come from a plurality of sources e.g. location coordinates from the Global Positioning Satellite system, neighbor lists of carrier assigned tower id and radio access technology, signal strength and MAC addresses from 802.11 access points. Each wireless device retains a history of location data it has collected. A profile directs location data to be transformed for privacy before being stored on the device. In an embodiment, previously stored and uploaded location data are included in the transformation of the MAC address into a credibility token. In an embodiment, the device can check a credibility token against its MAC address upon receiving a notification. In an embodiment, the device can check a credibility token against a current or past location attribute. Notifications are ignored unless they include a valid credibility token.

BRIEF DESCRIPTION OF THE SEVERAL VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

Figure 1:
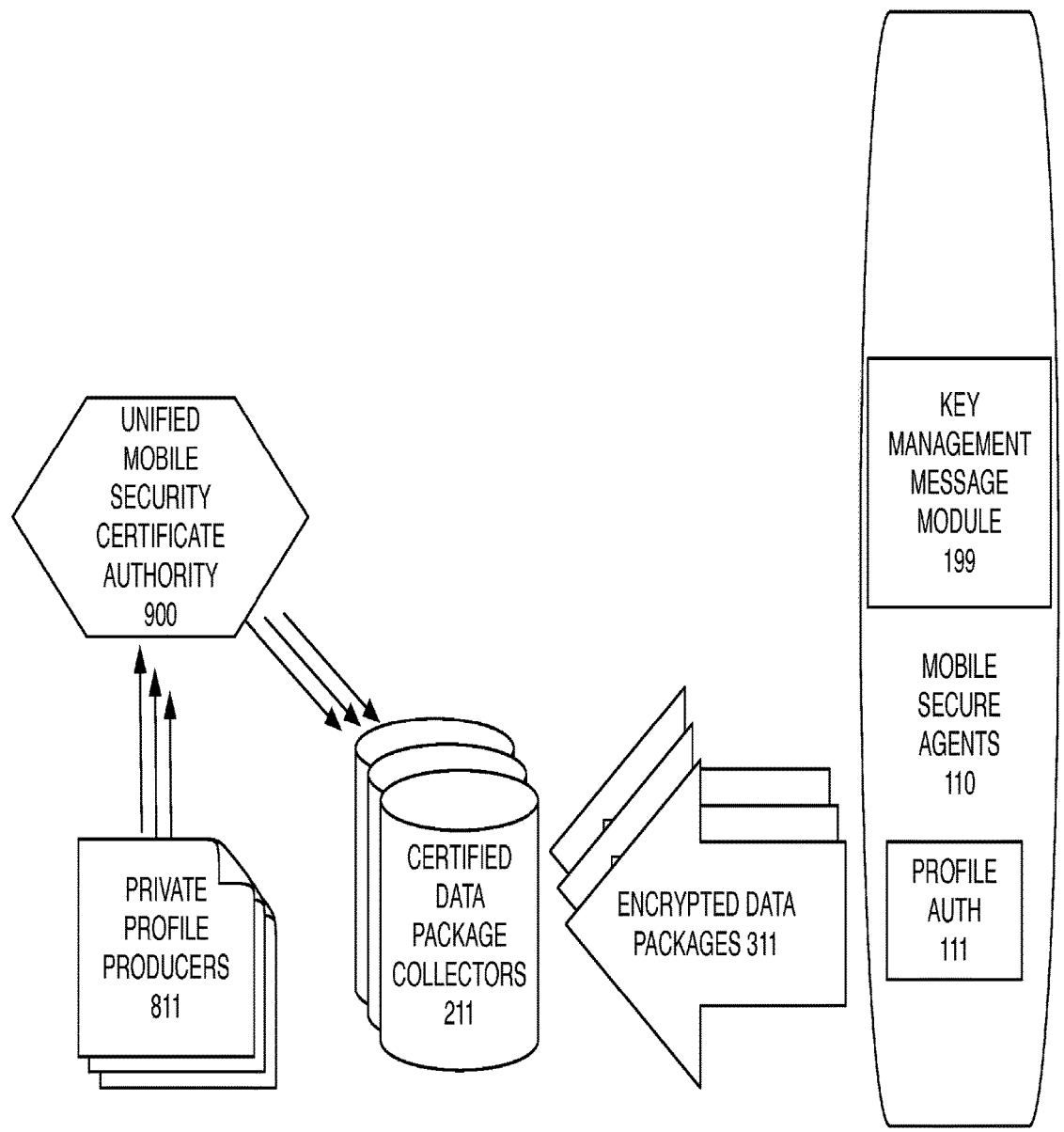
FIGS. 1-4 are block diagrams of embodiments of a system.

The data collection profiles have attributes which determine which metrics are authorized to be collected and transmitted. Furthermore certain metrics are to be encrypted before storage in the non-transitory media of the device. One example of an encrypted metric is location information derived from a current or past location coordinate. Hashing a latitude and a longitude is another example. The security service may look up past location histories for the device or for other devices and retrieve tower ids for neighbor lists and media access control (MAC) addresses for Wi-Fi access points. A credibility token includes at least a transformation of the MAC address of the wireless device. In embodiments, transformation also includes some aspect of current or past location. The credibility token is provided for provenance as part of a notification to update a data collection profile or to trigger a data collection procedure.

One aspect of the invention is a method for operation of a mobile secure agent controlling a processor on a wireless mobile device to perform at least the following: reading a media access control (MAC) address from a machine-readable non-transitory store and transforming it into a first credibility token; upon a first condition in a data collection profile evaluating as true, performing at least one measurement and transformation of metrics of the wireless mobile device and its location; receiving, encrypting, and storing geo-location data from a location service into a non-transitory store of the device; upon a second condition in a second data collection profile evaluating as true, opening a secure SSL tunnel to a data package collector server using a certificate associated with the profile; encrypting a data package including location data, as specified in the second profile; and transmitting the encrypted data package to the specified data package collector server having the associated certificate. Each co-resident profile may independently trigger, package, upload, etc with its own certificates.

The method includes upon receiving a request for a data package transmission in a notification text message, and authenticating a first credibility token associated with the notification, opening a secure SSL tunnel to a data package collector server using a certificate; encrypting a data package including location data as specified in the profile; and transmitting the encrypted data package to the specified data package collector server having a certificate.

The method includes upon receiving a profile update notification text message and authenticating a first credibility token associated with the notification, opening a secure SSL tunnel to a profile provisioning server using a certificate; requesting at least one updated profile; and authenticating the at least one updated profile upon reception; upon receiving a security update notification text message and authenticating a first credibility token associated with the notification, advancing a trust anchor or iterating a security certificate. Some updates may not merit their own notification but will piggy-back on another profile.

In an embodiment, the method also includes reading a location store of the mobile wireless device; transforming location data and MAC address into a second credibility token; and accepting the notification text message only on the condition of matching its payload with the second credibility token.

In embodiments, transforming includes decrypting or hashing or both.

In embodiments, location data comes from various sources. Examples of location data include but are not limited to neighbor lists, cellular base station identifiers, global positioning system coordinates, MAC addresses of Bluetooth beacons, IP addresses of WiFi access points, and latitude and longitude. Some coordinates include height or altitude.

Another aspect of the invention is a method at a unified mobile security server, which includes: generating a plurality of trust anchors; receiving a plurality of certificates from private signing authorities and authenticating each one; provisioning a plurality of mobile secure agents with trust anchors, cryptographic libraries, default profiles, and at least one signed certificate; generating a certificate for authentication by a unified mobile security certificate authority; provisioning a data package collector with an authenticated certificate; and distributing at least one certified profile update to a provisioner server. Because a mobile wireless device may be used for separate studies, surveys, and a variety of non-conflicting relationships, the provisioner server may send a plurality of profiles with different authors.

To prevent accidental or malicious spoofing, the method includes reading a media access control (MAC) address from a non-transitory computer readable store encoded with a media access control (MAC) address for each of a plurality of wireless mobile devices and transforming it into a first credibility token; embedding at least one credibility token into a notification text message for a selected device; directing a secure notifier apparatus to transmit a notification text message to at least one mobile secure agent to request an updated profile from the provisioner server; and upon receiving a request from a mobile secure agent, provisioning at least one updated data collection profile through a secure tunnel.

In an embodiment, the method also includes: determining an event at a mobile wireless device associated with a data package upload to a collector; reading a location data store; transforming the location data and the MAC address into a second credibility token; and embedding the resulting second credibility token into the notification text message.

In an embodiment, the transformation step is performing a hash.

In an embodiment, the method also includes encrypting the location data to match location data stored on a mobile wireless device.

Another aspect of the invention is a mobile wireless device apparatus which includes a non-transitory computer readable store encoded with a media access control (MAC) address by which the device is uniquely identifiable; a mobile secure agent; a baseband processor; an application processor; a display; memory; wherein the mobile secure agent includes a Key Management Message Module, a combination of hardware and software which is provided by and signed by a unified mobile security certificate authority (CA); at least one authenticated data collection profile which has its own certificate and which can be validated or revoked by the Key Management Message Module.

The invention covers any means for collecting and encrypting geo-location data upon a set of conditions triggering an event; means for collecting and packaging data; means for encrypting and transmitting a data package to a package collector having a correct certificate; means for receiving a notification message to transmit a package or request a replacement profile through a secure tunnel to a server; means for authenticating a profile by the Key Management Message Module which comprises libraries, anchors, certificates, and executable code; and a circuit to determine a first credibility token by transforming the MAC address and to accept a notification message which contains at least one credibility token. Profiles may provide the triggers and certificates to control processors as a means. A mobile security agent may also control processors to collect, package, and transmit data as a means. Means includes the application and baseband processors adapted by software either embedded or installed over the air.

In an embodiment, the mobile wireless device apparatus also includes a store for geo-location data; a circuit for encrypting and decrypting geo-location data; a circuit for transforming geo-location data and MAC address into a second credibility token; and a circuit to match the payload of the notification text message with the second credibility token.

In an embodiment, the apparatus also includes a circuit to determine which stored geo-location corresponds to an event selected by a server to determine a second credibility token. Because the profile defines which events or conditions trigger data collection, the server can refer to several geo-locations which are stored on the device in encrypted form. Thus a notification may be verified not only by the identity of the message recipient but also some history of the data collected on the device. Randomly guessing MAC addresses would have a certain level of success which would be substantially limited by additionally guessing location data.

In an embodiment, the apparatus also includes means for determining geo-location data selected from the group: global positioning system receiver, Bluetooth receiver, Wi-Fi radio circuit, and cellular telephone baseband processor. The means includes software controlling a processor. The software could combine two sources to improve accuracy. The software could fallback from using a preferred source to a secondary source if the first were unavailable. The software could prefer some sources of location data over others. The software may select the most common location or the location with a particular trigger such as handing off between two specific cell towers.

Another aspect of the invention is a security server which includes a non-transitory computer readable store encoded with a media access control (MAC) address for each of a plurality of wireless mobile devices; means for generating a plurality of trust anchors, receiving a plurality of certificates from private signing authorities and authenticating each one, and provisioning a plurality of mobile secure agents with trust anchors, cryptographic libraries, default profiles, and at least one signed certificate; a circuit to receive and store a plurality of private profiles; a certificate store; a circuit to transform a MAC address into a first credibility token; a circuit to configure a notification text message with a first credibility token; and a circuit to cause a text messaging system to transmit a notification message to a selected mobile wireless device. Means include combinations of hardware and software to introduce randomness into processes. Time or physical movements are sources which may be external to software for generating trust anchors. Data communications and non-transitory stores may provide transfers of certificates.

In an embodiment, the security server also includes a store for geo-location data for each of a plurality of mobile wireless devices; an event store to contain data collection packages received from each mobile wireless device; and a circuit to select geo-location data which is stored on a selected mobile wireless device. Examples of geo-location data known to both the security server and the mobile device include where a call was dropped most recently, the location where the battery was recharged, the location where a profile was updated or where a certificate was last iterated.

In an embodiment, the security server also includes a circuit to determine a second credibility token for the selected mobile wireless device by transforming selected geo-location data and a MAC address, and a circuit to embed the credibility token into a notification text message.

In an embodiment, the security server also includes a circuit to request transmission of a notification text message by a text messaging service to a selected mobile wireless device, wherein the geo-location data is encrypted to match the geo-location data stored on the selected mobile wireless device.

Another aspect of the invention is a system including a network which couples at least a secure notifier apparatus configured to receive a direction from a private signing authority and as a result, transmit a notification message to at least one mobile secure agent controlling a processor on a wireless mobile device; a certified profile update provisioner server configured to receive a certificate and at least one updated profile, receive a request for an SSL tunnel, authenticate the tunnel request using the certificate, and transmit at least one certified profile to a mobile secure agent.

The system includes a certified data package collector configured to receive a certificate from a private signing authority, receive a request from a mobile secure agent for a secure channel, authenticate using the certificate, and receive encrypted data packages for storage; at least one private profile producer apparatus, communicatively coupled to a unified mobile security certificate authority apparatus, and further coupled to the secure notifier apparatus, the certified profile update provisioner server and to a certified data package collector server.

The system is distinguished by a unified mobile security certificate authority apparatus coupled to a plurality of mobile secure agents configured with cryptographic libraries, default profiles, a plurality of authentication anchors and at least one certificate; at least one security server; at least one mobile wireless device comprising a data collection agent, at least one data collection profile and at least one cryptographic certificate; a cellular communication network; a text messaging system center; a profile distribution server configured with a certificate to respond to a request for an encrypted tunnel initiated by the mobile wireless device; and at least one data collector provided with a certificate to receive encrypted data packages from the mobile wireless device.

In an embodiment, the system also has at least one source of geo-location data accessible to each of a plurality of mobile wireless devices; a store of geo-location data for each of a plurality of mobile wireless devices related to an event resulting in recordation of metrics at said mobile wireless device; and computation means to determine a second credibility token match at both of at least one server and at least one mobile wireless device for a notification message transmitted from the server to the device. A processor of the mobile wireless device provides means by performing instructions that may be within the agent or within a profile. Examples to illustrate would be instructions to operate on a MAC address by hashing. Or combining location data with a MAC address. Location data may be encrypted or decrypted.

In embodiments, geo-location data can be received or inferred from various sources and location services. Non-limiting examples include global positioning satellites, fixed Wi-Fi access points, Bluetooth beacons, and cellular base stations. The location data may be determined by a location service within the mobile device or simply received from an external location service.

In an embodiment, events are defined in a profile to cause recordation of metrics including location data. Non-limiting but common examples of events of interest to a network carrier include a dropped call, beginning or end of charging a battery, a handover between cells of a cellular network, the replacement of a data collection profile, and transmission of a package to a data collector. A continuous stream of data issuing from the processors of the mobile wireless device are monitored by the agent. Triggers are set in a data collection profile to record certain metrics and transform them. Various signal strengths, locations, network conditions, and activity of applications may trigger or be of interest. The agent controls the processor but the profiles cause the agent to perform a specific data capture, transformation, or upload.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Referring now to FIG. 1, a system embodiment 100 has at least one of a plurality of mobile secure agents 110 installed in a mobile device which includes a baseband processor, an application processor, display, and memory. The mobile secure agent includes a Key Management Message Module 199 a combination of hardware and software which is provided by and signed by a unified mobile security certificate authority (CA) 900 in an embodiment a self-signed certificate authority. The CA has also authenticated at least one private profile producer 811. The mobile secure agent also has an authenticated profile 111 which has its own certificate and which can be validated or revoked by the Key Management Message Module 199. Upon discovery and evaluation of a set of conditions contained within the profile, the processor enables the mobile secure agent to collect data and to transmit data packages. Collected data may be discarded if the transmission conditions are never fulfilled. A data package may be encrypted and may be transmitted only to a certified data package collector 211 which has a corresponding key to receive the package and in an embodiment to decrypt the package. The data package may be encrypted only during transit or may be encrypted for storage. Thus the data package can only be transmitted to a package collector having the correct certificate and the encrypted data can only be decrypted by a collector having it. Furthermore the data is collected and subsequently transmitted according to a profile authenticated by the Key Management Message Module 199 which includes libraries, anchors, certificates, and executable code.

Figure 2:
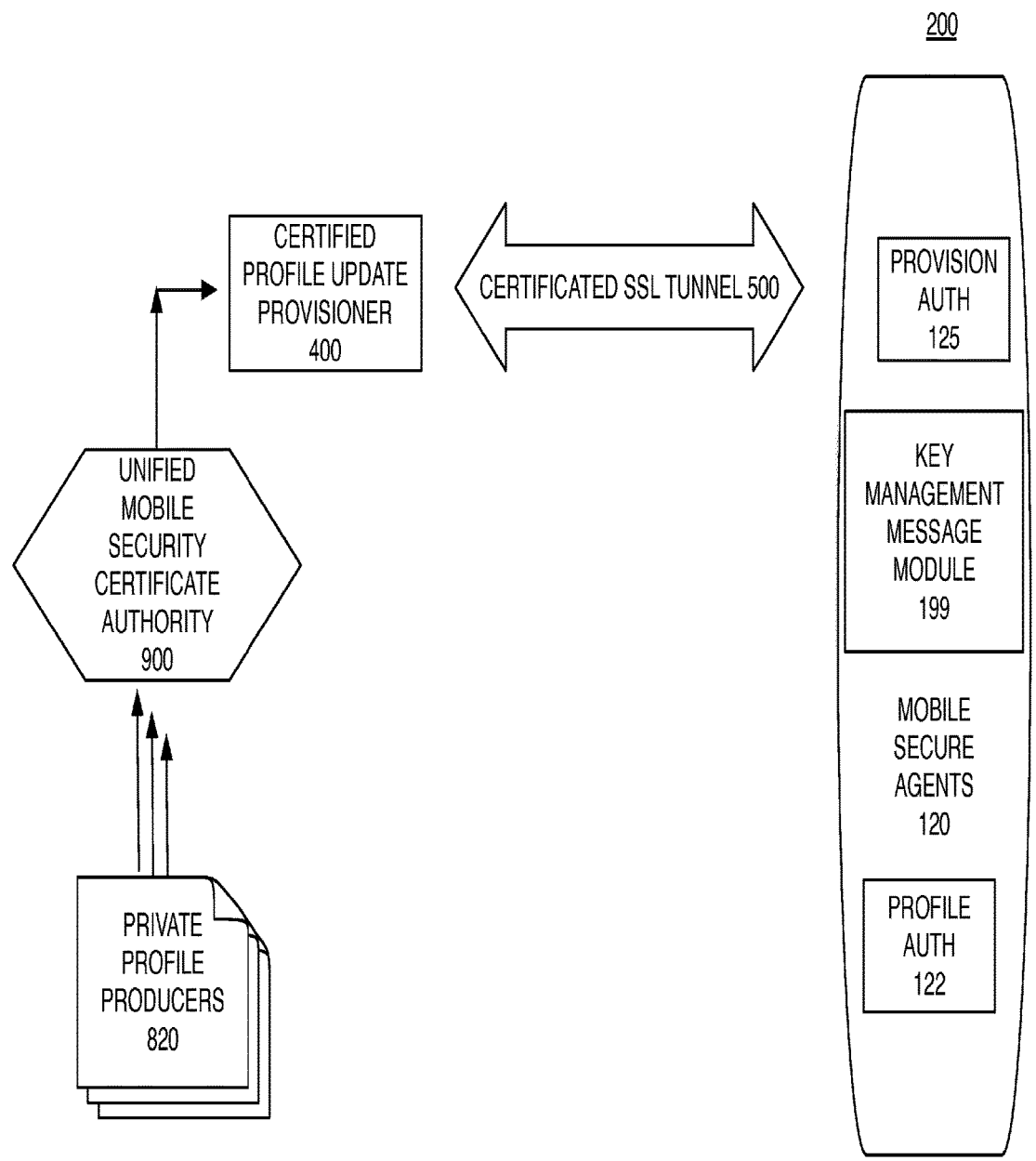

Referring now to FIG. 2, a private profile producer 820 is authenticated by the unified mobile security certificate authority (CA) 900 and generates an authenticated profile which is distributed by a certified profile update provisioner 400. A provision is initiated by a mobile secure agent 120 by launching a certificated SSL tunnel 500. The mobile secure agent 120 also comprises a provisioning authentication element 125 which starts the SSL tunnel, requests an updated profile, and authenticates the received profile 122 using the Key Management Message Module 199. All profiles are requested by the mobile secure agent from a certificated profile update provisioner and validated using the Key Management Message Module 199 provided by the CA 900. An aspect of the invention is the direction of this transfer which is initiated from the mobile device.

Figure 3:
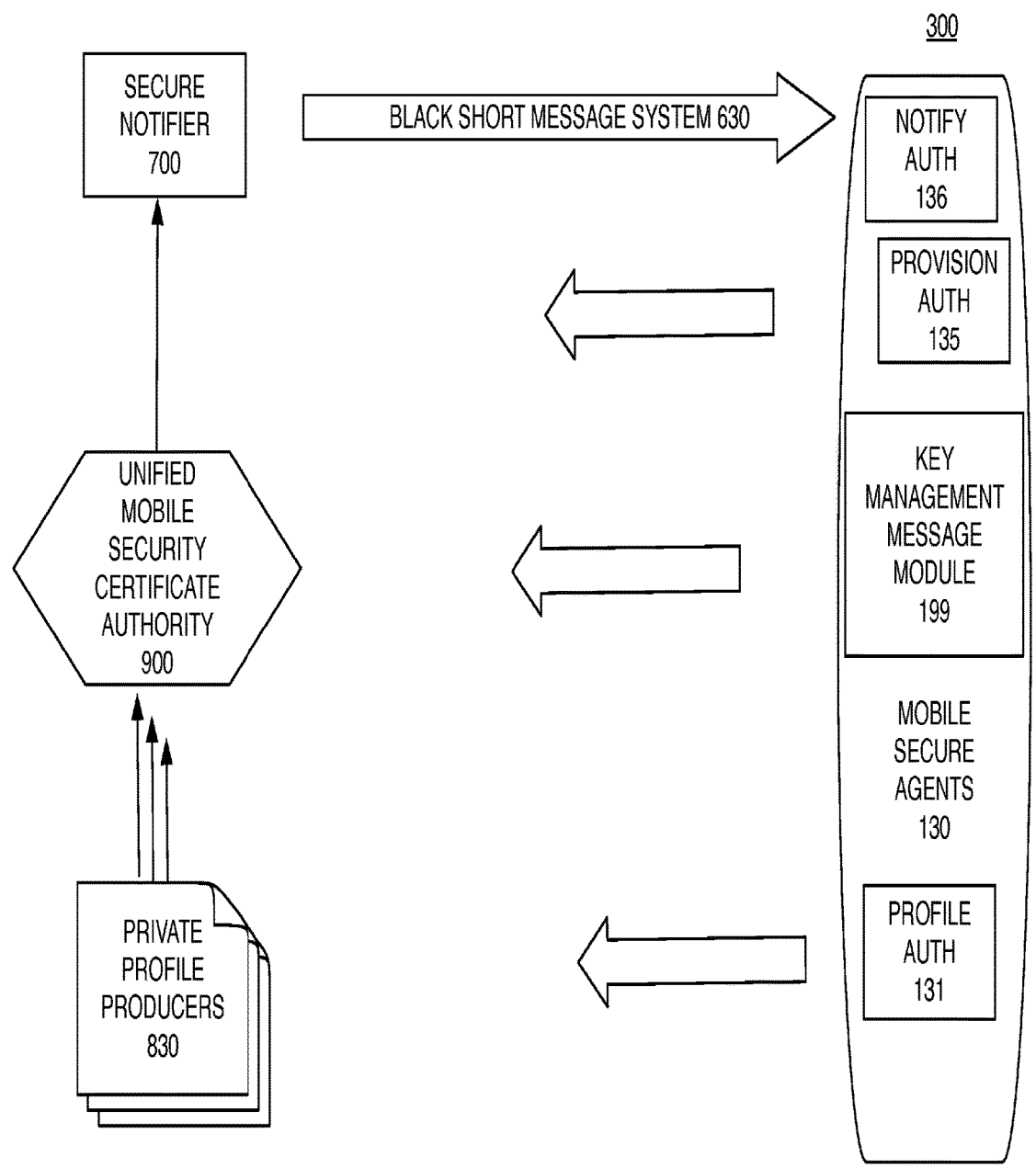

Referring now to FIG. 3, in an embodiment, a private profile producer 830 authenticated by the CA 900 may request a notification transmission by a secure notifier 700 which transmits a text message system notification 630 to a selected mobile secure agent 130. The notification is authenticated by a notification authentication module using personally determined credibility tokens 136. The notification can only trigger pre-defined operations at the mobile secure agent 130. In one embodiment, the notification causes the provisioning module to request an update profile from the profile provisioner. In an embodiment, the notification can alert the profile that a data package collector is available or reschedule a transmission of a data package. In an embodiment, the notification can initiate a request for an update to the Key Management Message Module. The Key Management Message may revoke a certificate and cause the Key Management Message Module 199 to advance to a new authentication anchor, thereby creating a new basis for authentications. As illustrated in FIG. 3, all the sessions which transmit payload are initiated by and from the Mobile Secure Agents to servers. The text messaging system provides triggers but cannot control the Mobile Secure Agents. We refer to a text messaging system such as SMS to deliver notifications not intended for display to the user of the mobile device and include a credibility token to support its provenance.

Figure 4:
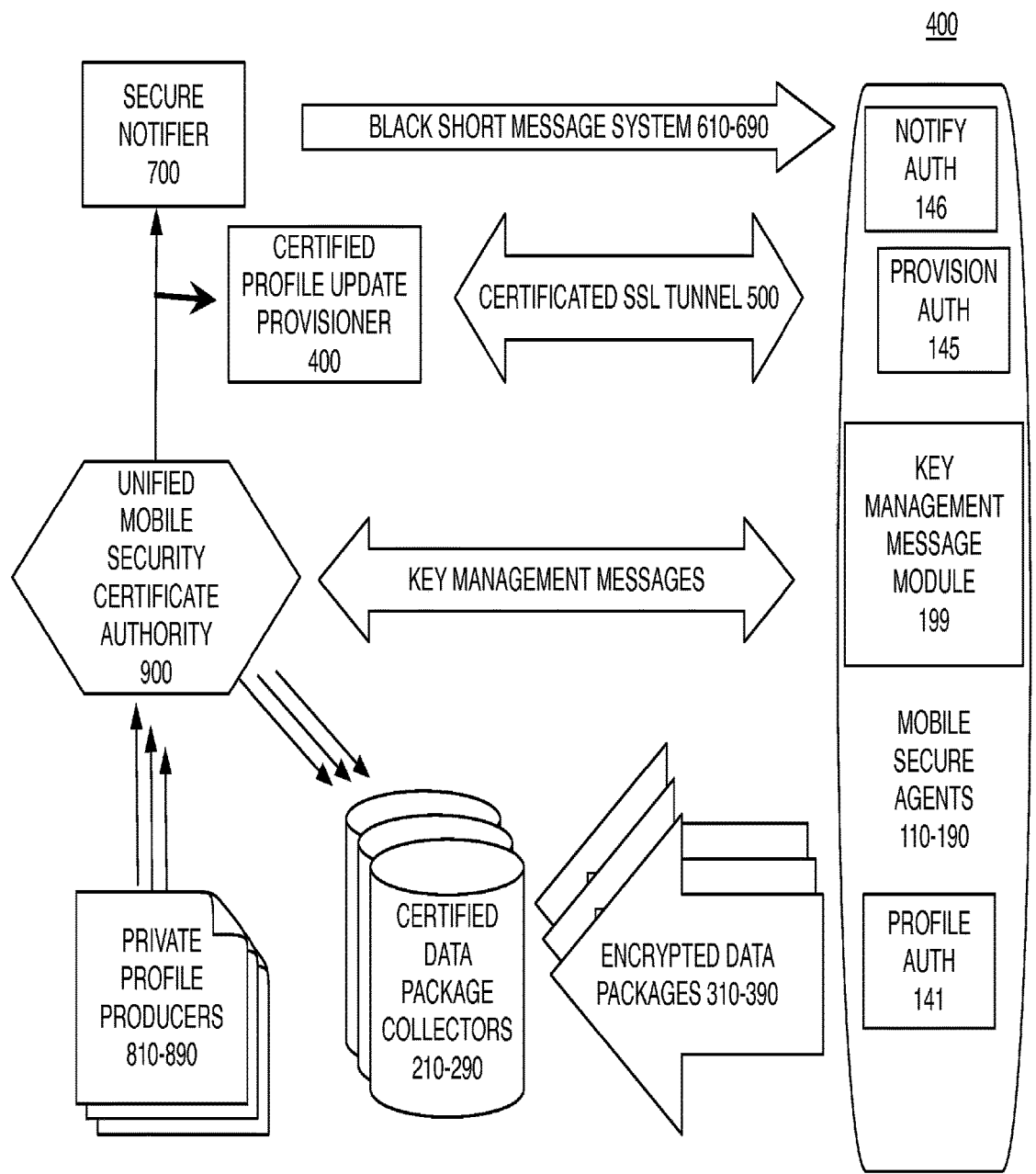

Referring now to FIG. 4, each of a plurality of private profile producers 810-890 submit new profiles for authentication by the CA which provides them to the profile update provisioner 400. The private profile producer may select a set of mobile secure agents to be notified to request the updated profile by the secure notifier 700. Each of the selected mobile secure agents 110-190 which are notified requests an updated profile by initiating an SSL tunnel 500, receiving and validating a new profile using the Key Management Message Module 199. Each data collection and transmission profile specifies conditions to collect certain data at the selected mobile device and other conditions to transmit the data packages to a certain certified data package collector. In a first embodiment, the location data are encrypted and stored in encrypted form. In a second embodiment, the data packages are encrypted during transit but decrypted upon receipt at the collector. Certificates at the data package collectors prevent data packages from being misrouted to unauthorized receivers.

Figure 5:
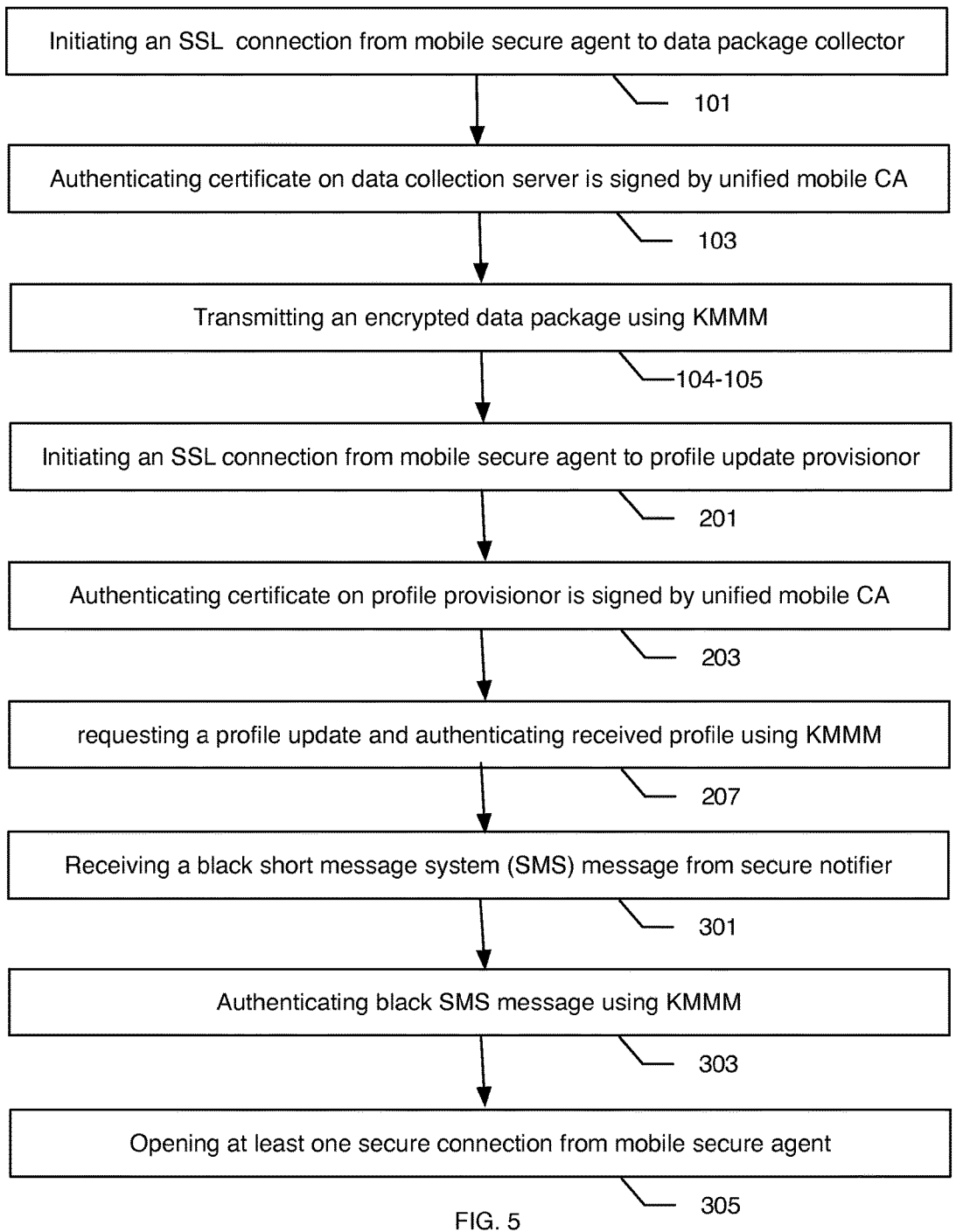
FIGS. 5-6 are flowcharts of method steps of a processor controlled as an aspect of the invention.

Referring now to FIG. 5, an exemplary method for operation of a mobile secure agent includes, upon completing conditional collection of data according to a data collection profile and determining conditions for transmitting a data packages are fulfilled, initiating a secure connection to a certified data package collector server as specified within a profile 101, in an embodiment an HTTPS protocol known in the art, authenticating the data package collector server is certificated by the unified mobile security certificate authority (CA) 103, and transmitting the data package 105. In an embodiment, encrypting the location data 104. In an embodiment, the method further includes updating a profile: upon determining that it is necessary to update a data collection profile (either according to the extant data collection profile or according to a notification described below), initiating a secure connection by the mobile secure agent to a certified profile update provisioner server 201, authenticating the profile update provisioner server has a certificate signed by the unified mobile security certificate authority (CA) 203, requesting a profile update 205, authenticating the received profile update using the Key Management Message Module 207, and installing the new profile update 209. In an embodiment, the method further comprises receiving a text message system (e.g. SMS) notification 301 from a secure notifier, authenticating the notification message 303 by the Key Management Message Module, using a personally unique credibility token and opening at least one secure connection 305 from the mobile secure agent to obtain a profile update, a Key Management Message, or to transmit an encrypted data package to a data package collection server.

It can be appreciated that the benefit of the disclosed security architecture provided by the subject matter of this application enables certificates to be revoked and replaced. Data collected for one private profile producer cannot be received or decrypted by another private profile producer. Profiles are authenticated before use. Profiles are retrieved from a certificated profile update provisioner by the mobile secure agent and cannot be pushed to the mobile secure agent. Each notification can be authenticated by a personally unique credibility token. This provides a system where only private profile producers trusted by the enduser of the wireless mobile device may cause data to be collected and then under certain conditions transmitted to a data package collector authenticated by the profile. No data is collected and stored at the mobile secure agent unless a profile has been authenticated by the Key Management Message Module 199.

Figure 6:
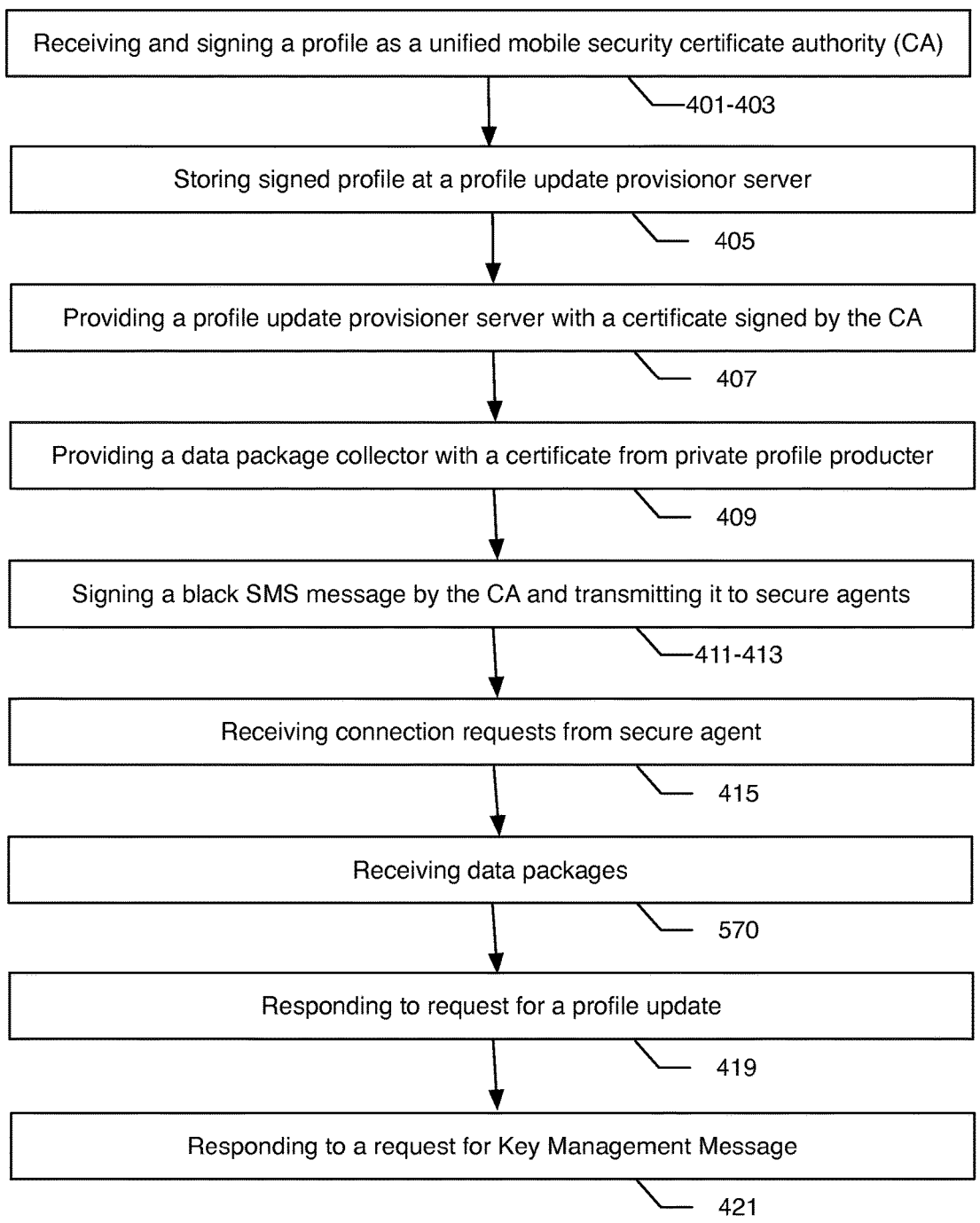

Referring now to FIG. 6, a method for operating a unified mobile security system includes receiving a profile from a private profile producer 401, signing the profile as the unified mobile security certificate authority (CA) 403, storing the signed profile at a profile update provisioner server 405, providing the profile update provisioner server with a certificate signed by the unified mobile security CA 407, providing a certified data package collector with a certificate from the private profile producer signed by the unified mobile security CA 409, embedding within a text message system (e.g. SMS) message a personally unique credibility token 411 and transmitting it to selected mobile secure agents 413, receiving connection requests from a mobile secure agent 415, receiving encrypted data packages 417, responding to a request for a profile update 419, and responding to a request for an updated Key Management Message 421.

Other aspects of the invention are methods for operation of the mobile agent in control of a processor, methods for operation of a server to provision profiles, generate profiles, sign profiles and certificates, and provide Key management message modules. These methods and apparatuses are in embodiments such as the following:

A method for operating a mobile secure agent controlling a processor on a wireless mobile device, upon a condition in a profile evaluating as true, opening a secure SSL tunnel to a data package collector server using a certificate associated with the profile; encrypting a data package as specified in the profile; and transmitting the encrypted data package to the specified data package collector server having the associated certificate.

In another embodiment, the method further includes upon receiving a text message system notification and authenticating a personally unique credibility token embedded within the notification, opening a secure SSL tunnel to a profile provisioning server using a certificate; requesting any updated profile; and authenticating the updated profile upon reception.

In another embodiment, the method further includes upon receiving a request for a data package transmission in a notification, and authenticating the credibility token embedded within the notification, opening a secure SSL tunnel to a data package collector server using a certificate; encrypting a data package as specified in a profile; and transmitting the encrypted data package to the specified data package collector server having a certificate.

Another aspect of the invention is at a unified mobile security certificate authority apparatus, a method including at least generating a plurality of trust anchors; receiving a plurality of certificates from private signing authorities and authenticating each one; and provisioning a plurality of mobile secure agents with trust anchors, cryptographic libraries, default profiles, and at least one signed certificate.

At a private profile producer apparatus, the invention controls one or more processors to perform a method comprising: generating a certificate for authentication by a unified mobile security certificate authority; provisioning a data package collector with an authenticated certificate; distributing a certified profile update to a provisioner server; and directing a secure notifier apparatus to transmit a text message system notification authenticated by a personalized credibility token to each one of a plurality of mobile secure agents to request an updated profile from the provisioner server. A conventional short message system which does not display certain messages to the user can be understood as a text message system for notification utilizing a personally unique credibility token.

Another aspect of the invention is a system communicatively coupled together by a network comprising: a secure notifier apparatus configured to receive a direction from a private signing authority and as a result, transmit a text message notification authenticated by a credibility token to at least one mobile secure agent controlling a processor on a wireless mobile device; a certified profile update provisioner server configured to receive a certificate and an updated profile, receive a request for an SSL tunnel, authenticate the tunnel request using the certificate, and transmit a certified profile to a mobile secure agent; a certified data package collector configured to receive a certificate from a private signing authority, receive a request from a mobile secure agent for a secure channel, authenticate using the certificate, and receive encrypted data packages for storage.

In an embodiment, the system further has at least one private profile producer apparatus, communicatively coupled to a unified mobile security certificate authority apparatus, and further coupled to the secure notifier apparatus, the certified profile update provisioner server and to a certified data package collector server.

In an embodiment, the system further includes the unified mobile security certificate authority apparatus coupled to a plurality of mobile secure agents configured with cryptographic libraries, default profiles, a plurality of authentication anchors and at least one certificate.

For expository clarity and illustrative simplicity separate connections are shown and described. However, as known to those skilled in the art, a single apparatus comprising a processor and memory can serve one or more of the disclosed functions. As an example, the profile provisionor server and the data collector servers may in an embodiment be virtual machines within a single apparatus. In an embodiment the separately shown secure connections initiated from the mobile secure agents may be all uses of a single protocol. In an embodiment, the one or more private profile producers may share occupancy of an apparatus together and in combination with the unified mobile security certificate authority as long as they do not have direct connection to the mobile secure agents. Similarly the secure notifier can be a conventional text messaging system such as SMS, apparatus but having the limitation of not providing messages visible to the user of the mobile device and employing a credibility token within or associated with the message or series of messages.

CONCLUSION

The present invention is distinguished by receiving a notification which includes a credibility token. A credibility token is a transformation of the media access control (MAC) address of the recipient wireless device. In an embodiment, the transformation operates on location history of the wireless mobile device. The location history is selected from measurements and codes of signals received from NFC, Bluetooth, 802 compatible access points, GPS coordinates, and neighbor lists of cellular communication base stations. In an embodiment, the invention is distinguished from conventional software PKI signing by including location data previously uploaded from the wireless mobile device upon a trigger provided within a data collection profile.

The present invention is easily distinguished from non-unified security architectures which only provide piece-meal security solutions to mobile devices such as tablets, and smart phones. The present invention is easily distinguished from conventional security systems by its unified mobile security certificate authority. It can be appreciated that conventional wired network certificates are too voluminous for efficient use in a mobile wireless network. It is distinguishing characteristic that profiles and Key Management Messages and Modules are not "pushed" to mobile devices which would create an opportunity for unauthorized data leaks. The present invention is further distinguished by multi-programming the agent with independently authored profiles which contain triggers, collection policies, and upload schedules that co-reside without interference. All profiles are authenticated and provisioned through a unified security system.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method for operation of a mobile secure agent controlling a processor on a wireless mobile device, the method comprising:
reading a media access control (MAC) address from a machine-readable non-transitory store and transforming the media access control address into a first credibility token;
upon a first condition in a first data collection profile evaluating as true, performing at least one measurement and transformation of metrics of the wireless mobile device and determining location data of the wireless mobile device, wherein the location data identifies at least one location associated with the wireless mobile device, wherein the location data is stored into a non-transitory store of the wireless mobile device;
upon a second condition in a second data collection profile evaluating as true, opening a SSL (Secure Sockets Layer) tunnel to a second data package collector server using a second certificate associated with the second data collection profile;
encrypting a data package including the location data, as specified in the second data collection profile; and
transmitting the encrypted data package to the second data package collector server having the second certificate associated with the second data collection profile;
upon receiving a request for a data package transmission in a notification text message that included the first credibility token, and authenticating the first credibility token associated with the notification text message, opening an SSL tunnel to a first data package collector server using a first certificate;
encrypting a data package including the location data as specified in the first data collection profile; and
transmitting the encrypted data package to the first data package collector server having the first certificate; and
upon receiving a profile update notification text message and authenticating the first credibility token associated with the profile update notification text message, opening a secure SSL tunnel to a profile provisioning server using a certificate, wherein the first credibility token establishes a provenance;
requesting at least one updated profile; and
authenticating the at least one updated profile upon reception;
upon receiving a security update notification text message and authenticating the first credibility token associated with the update notification text message, advancing a trust anchor or iterating a security certificate.

2. The method of claim 1, further comprising:
reading a location store of the mobile wireless device;
transforming the location data and the MAC address into a second credibility token; and
accepting the notification text message only on a condition of matching a payload of the notification text message with the second credibility token.

3. The method of claim 2, wherein transforming comprises at least one of:
decrypting and hashing.

4. The method of claim 2, wherein location data comprises at least one of:
neighbor lists, cellular base station identifiers, global positioning system coordinates, MAC addresses of Bluetooth beacons, IP addresses of WiFi access points, and latitude and longitude.

5. At a unified mobile security server, a method comprising:
generating a plurality of trust anchors;
receiving a plurality of certificates from private signing authorities and authenticating each one of the plurality of certificates;
provisioning a plurality of mobile secure agents with the plurality of trust anchors, cryptographic libraries, default profiles, and at least one signed certificate,
generating a certificate for authentication by a unified mobile security certificate authority;
provisioning a data package collector with an authenticated certificate;
distributing at least one certified profile update to a provisioner server;
reading a media access control (MAC) address from a non-transitory computer readable store for each of a plurality of wireless mobile devices and transforming each of the MAC addresses into a credibility token, wherein the credibility token establishes a provenance;
embedding at least one credibility token into a notification text message for a selected device from among the plurality of wireless mobile devices;
directing a secure notifier apparatus to transmit the notification text message to a mobile secure agent of the selected device such that the mobile secure agent requests at least one updated profile from the provisioner server, the mobile secure agent of the selected device included in the plurality of mobile secure agents; and
upon receiving a request from the mobile secure agent, provisioning at least one updated data collection profile through a secure tunnel.

6. The method of claim 5, further comprising:
determining an event at a wireless mobile device included in the plurality of wireless mobile devices, wherein the mobile wireless device is associated with a data package upload to a collector;
reading location data from a store;
transforming the location data and the MAC address into a second credibility token; and
embedding the second credibility token into the notification text message.

7. The method of claim 6 wherein the transformation step includes performing a hash.

8. The method of claim 6, further comprising encrypting the location data to match location data stored on the mobile wireless device.

9. A mobile wireless device, the device comprising:
a non-transitory computer readable store encoded with a media access control (MAC) address by which the device is uniquely identifiable;
a mobile secure agent;
a baseband processor;
an application processor;
a display;
a memory;
wherein the mobile secure agent comprises a Key Management Message Module that includes a combination of hardware and software which is provided by and signed by a unified mobile security certificate authority (CA);
at least one authenticated data collection profile which has its own certificate and which can be validated or revoked by the Key Management Message Module;
means for collecting and encrypting location data upon a set of conditions triggering an event;
means for collecting and packaging data;
means for encrypting and transmitting a data package to a package collector having a correct certificate;
means for receiving a notification message to transmit a package or request at least one replacement profile through a secure tunnel to a server;
means for authenticating at least one profile by the Key Management Message Module which comprises libraries, anchors, certificates, and executable code; and
a circuit to determine a first credibility token by transforming the MAC address and to accept a notification message which contains the first credibility token, wherein the first credibility token establishes a provenance.

10. The device of claim 9, further comprising:
a store for the location data;
a circuit for encrypting and decrypting the location data;
a circuit for transforming the location data and MAC address into a second credibility token; and
a circuit to match the payload of the notification text message with the second credibility token as a precondition to acceptance of the notification text message.

11. The device of claim 10, further comprising:
a circuit to determine which of the stored location data corresponds to an event selected by the server to determine the second credibility token.

12. The device of claim 11, further comprising:
means for determining the location data selected from the group:
a global positioning system receiver, a Bluetooth receiver, a Wi-Fi radio circuit, and a cellular telephone baseband processor, wherein the location data determined by the means for determining the location data is collected and included in the data package by the means for collecting and packaging data.

13. A security server comprising:
a non-transitory computer readable store that stores a media access control (MAC) address for each of a plurality of wireless mobile devices;
means for generating a plurality of trust anchors, receiving a plurality of certificates from private signing authorities and authenticating each one of the plurality of certificates, and provisioning a plurality of mobile secure agents with the trust anchors, cryptographic libraries, default profiles, and at least one signed certificate;
a circuit to receive and store a plurality of private profiles;
a certificate store;
a circuit to transform a MAC address into a first credibility token, wherein the first credibility token establishes a provenance;
a circuit to configure a notification text message with the first credibility token; and
a circuit to cause a text messaging system to transmit the notification text message to a selected mobile wireless device included in the plurality of wireless mobile devices.

14. The security server of claim 13, further comprising:
a store for location data for each of the plurality of mobile wireless devices;
an event store configured to contain data collection packages received from each of the plurality of mobile wireless devices; and
a circuit to select the data from the store for location data, wherein the location data is also stored on the selected mobile wireless device.

15. The security server of claim 14, further comprising:
a circuit to determine a second credibility token for the selected mobile wireless device by transforming selected location data and a MAC address, and
a circuit to embed the second credibility token into the notification text message.

16. The security server of claim 15, further comprising:
a circuit to request transmission of the notification text message by a text messaging service to the selected mobile wireless device, wherein the location data is encrypted to match the location data stored on the selected mobile wireless device.

17. A system communicatively coupled by a network, the system comprising:
a secure notifier apparatus configured to receive a direction from a private signing authority and as a result, transmit a notification message to at least one mobile secure agent controlling a processor on a wireless mobile device;
a certified profile update provisioner server configured to receive a certificate and at least one updated profile, receive a request for a Secure Sockets Layer (SSL) tunnel, authenticate the SSL tunnel request using the certificate, and transmit at least one certified profile to the at least one mobile secure agent;
a certified data package collector configured to receive a certificate from a private signing authority, receive a request from the at least one mobile secure agent over a secure channel, authenticate using the certificate, and receive encrypted data packages for storage from the mobile secure agent;
at least one private profile producer apparatus, communicatively coupled to a unified mobile security certificate authority apparatus, and further coupled to the secure notifier apparatus, the certified profile update provisioner server and to a certified data package collector server;
the unified mobile security certificate authority apparatus coupled to a plurality of mobile secure agents configured with cryptographic libraries, default profiles, a plurality of authentication anchors and at least one certificate;
at least one security server;
at least one mobile wireless device comprising a data collection agent, a plurality of data collection profiles and at least one cryptographic certificate;
a cellular communication network;
a text messaging system center that sends a notification to the mobile wireless device, wherein the notification includes a credibility token to establish a provenance of the notification;
wherein the certified profile update provisioner server is configured to respond to a request for an encrypted tunnel initiated by the mobile wireless device; and
at least one data collector provided with a certificate to receive encrypted data packages from the mobile wireless device.

18. The system of claim 17, further comprising:
at least one source of location data that is accessible to each of a plurality of mobile wireless devices;
wherein each of the plurality of mobile wireless devices includes a store of location, wherein the location data in each store is related to a corresponding event resulting in recordation of metrics at said mobile wireless device; and
computation means to determine a second credibility token match at both the certified profile update provisioner server and at least one mobile wireless device included in the plurality of mobile wireless devices for a notification message transmitted from the certified profile update provisioner server to the device.

19. The system of claim 18 wherein a source of the location data is at least one of the group: global positioning satellites, fixed Wi-Fi access points, Bluetooth beacons, and cellular base stations.

20. The system of claim 18 wherein the event that results in recordation of metrics including the location data is at least one of the group: dropped call, charging a battery, handover between cells of a cellular network, replacement of a data collection profile, and transmission of a package to a data collector.

* * * * *